3,798,128
METHOD FOR THE PRODUCTION OF GRANULAR ENZYME PREPARATION
Shinpei Minato, Hyogo, Jisaku Goto, Osaka, and Kiyoshi Katagiri and Hiromi Nakatani, Kyoto, Japan, assignors to Takeda Chemical Industries, Ltd., Osaka, Japan
No Drawing. Filed Apr. 5, 1971, Ser. No. 131,493
Claims priority, application Japan, Apr. 8, 1970, 45/29,896
Int. Cl. C07g 7/02
U.S. Cl. 195—68       4 Claims

ABSTRACT OF THE DISCLOSURE

The present invention relates to an improved process for producing a granular enzyme preparation which comprises blending an aqueous enzyme solution and water soluble salt with a hydrophilic organic solvent at specific concentration and temperature. The advantages of the process include improved ease of handling, safety and uniformity of product.

---

This invention relates to a method for producing granular enzyme preparations.

The conventional process for the manufacture of granular enzyme preparations comprises the steps of blending a powdery enzyme with a solid vehicle, wetting the blend with, for example, water, mechanically granulating or size-selecting the moist blend and finally drying the granules.

However, this conventional powder-handling process has not yet lent itself to complete mechanization or automatic process control but depends to a certain extent upon manual operations. Furthermore, some enzymes including protease, lipase and the like are rather deleterious to the human body and so to defend the operators against evil effects of enzyme, the processing of them requires the provision of costly ancillary equipment for pneumatic evacuation, ventilation and other hygienic services. In addition, even in the blending of such a powdery enzyme with a solid vehicle and in the granulation of the blend, the powders do not lend themselves easily to a continuous, quantitative operation, with the result that the final granules inevitably have the disadvantage of more or less variation in quality, for example, in granule size and potency distribution.

The method of this invention is free from the above disadvantages. This invention is directed to a method of manufacturing a granular enzyme preparation, characterized by blending an aqueous solution containing both an enzyme and a water-soluble salt with a hydrophilic organic solvent recovering the resulting sediment and finally drying the sediment.

The method of this invention can be applied to a wide spectrum of enzymes, including protease such as pepsin, trypsin, chymotrypsin, catepsin, papain, bromelin, ficin, bacterial protease, mold-protease, yeast-protease, etc., amylase, lipase, cellulase, lysozyme, urease. The method can also be applied with success to the granulation of alkali protease which has recently been gathering attention as an enzyme for detergent.

Among the water-soluble salts useful for the process of this invention are various inorganic salts including phosphates such as sodium tripolyphosphate, potassium tripolyphosphate, sodium pyrophosphate, etc.; sulfates such as sodium sulfate, potassium sulfate, ammonium sulfate, etc.; carbonates such as sodium carbonate potassium carbonate, etc.; bicarbonates such as sodium bicarbonate potassium bicarbonate etc. alkali halides such as sodium chloride, potassium bromide, etc.; nitrates such as sodium nitrate, ammonium nitrate, etc.; and borates such as sodium borate, potassium borate, borax, etc.; as well as various organic salts including sodium mono glutamate, sodium diglutamate, sodium citrate, sodium ascorbate, calcium ascorbate, sodium acetate and the like. Besides those salts mentioned above, any other salts may be employed only if they are water-soluble and do not adversely affect the activity and stability of the particular enzyme being processed. The salts may also be used either alone or as a mixture, for example, as a buffer solution.

The mixed aqueous solution of the enzyme and salt, which is to be employed according to this invention, can be prepared by any procedure of choice, for example, by the method which comprises dissolving the enzyme and salt separately in water and blending the resulting solutions together; the method which comprises preparing a concentrated solution of the salt and, then, dissolving or dispersing a predetermined amount of the enzyme in the solution; or the method in which the salt is dissolved in a previously prepared solution of the enzyme. The enzyme solution may contain the incubation medium ingredients used for the production of the enzyme, such as polysaccharides, soluble starch, etc., as well as the organic or inorganic salt used for pH adjustment. A binder such as, for example, soluble starch or sodium carboxymethylcellulose may also be incorporated in the enzyme solution. The concentrations of the enzyme and of the salt in the mixed aqueous solution may usually be about 3.1 to about 3.9% and 5 to 50%, preferably 30 to 50%, respectively. The concentrations are preferably as high as possible, that is to say, as near to the respective saturation points as possible. The ratio of the enzyme to the salt, within the scope of this invention, depends upon the activity or enzyme units desired in the final granular enzyme preparation. Generally speaking, the ratio may fall within the range of 1 to 3:1 to 10.

The organic solvent to be employed in the practice of this invention may be any hydrophilic solvent. For all practical purposes, however, alcohols such as methanol, ethanol, etc., lower ketones such as acetone, or any optional mixture of such solvents may be employed.

The amount of the organic solvent to be employed for blending with the aqueous solution of enzyme and salt may generally be in the range of about 1–10 volumes, preferably about 2–5 volumes, however, it may freely be chosen with reference to the desired granule size distribution and specific volume of the granular enzyme preparation.

In manufacturing the present granular enzyme preparation, the aqueous enzyme-salt solution is blended with the water-soluble organic solvent, preferably with agitation. The agitation may be conducted at a rate of revolution of agitator ranging from 50 to 12,000 r.p.m. for about 1–10 minutes when a beaker of, for example, 1 liter capacity is employed. When using a large-capacity tank, a rate of revolution commensurate with the comparable agitation effect is desirable. The temperature employed in the agitation may range from 5° to 40° C. and, preferably 15° to 25° C. To blend the enzyme-salt solution with the organic solvent, the solvent can be poured or dripped into the solution or, alternatively, the solution may be dripped or poured into the organic solvent. The granule size distribution and specific volume of the granular enzyme preparation may be controlled as desired by adjusting the temperature concentrations of the solution, volume of solvent and the agitation rate. For instance, if the enzyme preparation is manufactured at a low temperature, at high concentrations, with a large volume of a solvent and at a high agitation speed, the granules will be comparatively small in size.

The enzyme granules precipitated by the above-described procedure can be recovered by a technique that is conventional per se, for example, by centrifugation or routine filtration.

The granules are then washed with a water-soluble organic solvent such as methanol, ethanol or acetone and dried. The drying of the granules is preferably carried out at a temperature of not more than 50° C., although a higher temperature of up to 70° C. may be employed in the case of vacuum drying.

Since, in accordance with this invention, the entire process of granulation proceeds in a solution phase, there is no risk of harm being done by dust and enzyme particles to the human body. In addition, because both the blending and granulation steps involve the handling of liquids, the process lends itself to easy control, which means less ancillary equipment demands and greater savings in labor required.

The granule, composed of enzyme and salt, obtainable by the method of this invention is very large in specific volume and has a size between 0.074–3.36 mm. In the granules obtainable by the method of this invention, the proportion of the enzyme and the salt in each granule is substantially the same irrespective of the size of each granule. Accordingly, no substantial difference in the enzymic activity is observed even among the granules of different sizes. In addition, each granule is so stable that even on prolonged storage at room temperature it does not suffer from reduction in enzyme units.

Throughout the specification, the abbreviations "%," "° C.," "r.p.m." and "PU/ml." mean weight by weight percent, degree centigrade, round per minute and protease units/milliliter, respectively.

In the following reference and examples, the relationship between part(s) by weight and part(s) by volume is the same as that between gram(s) and milliliter(s).

REFERENCE 1

Protease used in the following examples is obtained by the following processes.

500 parts by volume of a liquid medium, containing 5% defatted soybean meal, 5% glucose, 2% sodium dihydrogen phosphate, and adjusted to pH 7, is fed to a fermenter (its capacity being 2000 parts by volume), sterilized, and inoculated with Fusarium sp. S–19–5 (IFO 8884), followed by incubation at 28° C. for 5 days under aeration and agitation to prepare a seed culture.

The culture is inoculated to 30,000 parts by volume of a liquid medium having the same components as above in a fermenter (its capacity being 50,000 parts by volume) and is incubated at 25° C. for 144 hours with the aeration rate of 45,000 parts by volume per minute under the agitation of 500 r.p.m. During the incubation, foaming is suppressed by the addition of a suitable amount of soybean oil from time to time.

Change of the pH value and the protease activity in the course of the cultivation are shown as follows,

| Time of culture (hours) | 0 | 18 | 30 | 42 | 54 | 66 | 78 | 90 | 122 | 144 |
|---|---|---|---|---|---|---|---|---|---|---|
| pH of culture | 7.30 | 6.40 | 6.30 | 6.12 | 6.35 | 6.72 | 7.30 | 7.09 | 7.50 | 7.50 |
| Enzyme activity (PU/ml.) | | 67 | 141 | 1,430 | 2,250 | 2,270 | 2,520 | 2,520 | 2,760 | 2,540 |

The culture obtained after 144 hours is cooled to about 5° C. and, then, passed through a filter press with the filter aid, Hyflo Super-Cel (Johns-Manville Products Corp., U.S.A.), whereby the mycelia are removed. To the resulting 20,000 parts by volume of the filtrate is added 0.6 saturated ammonium sulfate, and the salted-out precipitate is collected by filtration with the filter aid. The resulting ammonium sulfate precipitate containing the filter aid is dissolved in about 6,000 parts by volume of cold water and insoluble materials are removed by filtration. 0.6 saturated ammonium sulfate is then added to the filtrate, so as to precipitate the enzyme again, which is, in turn, collected by centrifugation, dissolved in 1,000 parts by volume of cold water, dialyzed against cold water by means of a fish-skin diaphragm for 4 days and lyophilized to give a crude enzyme powder with brownish color. Thus obtained protease exhibits a potent activity in the pH range from 8.0 to 12.0 particularly, from 10.0 to 11.5.

EXAMPLE 1

500 parts by volume of an aqueous solution containing 100 parts by weight of protease (71,300 PU/ml.) is blended with a solution of 500 parts by weight of sodium sulfate (anhydrous) in 2,000 parts by volume of water (37° C.), and while the temperature of the blend is held at 20°–25° C., 5,000 parts by volume of acetone is added, with agitation at 300 r.p.m. The mixture is stirred for further 3 minutes at the same temperature and then, allowed to stand for a while, whereby granules are deposited. The mixture is subjected to centrifugation to collect the granules, which are washed well with 5,000 parts by volume of acetone and dried under reduced pressure at 35° C. The procedure yields 566 parts by weight of a granular enzyme preparation, the characteristics of which are tabulated hereinbelow. Substantially no reduction in enzyme units is encountered during the foregoing process.

EXAMPLE 2

500 parts by volume of an aqueous solution containing 100 parts by weight of protease (48,500 PU/ml.) is blended with a solution of 500 parts by weight of sodium tripolyphosphate (anhydrous) in 2,000 parts by volume of hot water (80° C.). While the blend is held at 25°–40° C., with agitation at 300 r.p.m., 5,000 parts by volume of ethanol is added. The mixture is stirred for further 3 minutes at the same temperature and allowed to stand for 1 minute or so, whereby granules are deposited. The granules separated from the supernatant are washed with 2,500 parts by volume of acetone and dried under reduced pressure at 60° C. The procedure yields 758 parts by weight of a granular enzyme preparation.

EXAMPLE 3

500 parts by volume of an aqueous solution of 100 parts by weight of protease (61,300 PU/ml.) is blended with a solution of 680 parts by weight of borax (hydrate having 10 moles of water) in 2,000 parts by volume of hot water (80° C.), and while the blend is held at 30°–40° C. with agitation at 200 r.p.m., 5,000 parts by volume of acetone is added.

The mixture is stirred for further 3 minutes at the same temperature and, then, allowed to stand for a while, whereby granules are deposited. The granules separated from the supernatant are washed twice with 2,500 parts by volume each of acetone and dried in a current of air at 40° C. The procedure yields 591 parts by weight of a granular enzyme preparation. Substantially no reduction in enzyme units is encountered during the foregoing process.

EXAMPLE 4

500 parts by volume of an aqueous solution containing 100 parts by weight of protease (36,800 PU/ml.) is blended with an aqueous solution prepared by dissolving 500 parts by volume of sodium tripolyphosphate in 2,000 parts by volume of hot water (80° C.). The blend is poured into 5,000 parts by volume of methanol, at 30°–40° C., with stirring at 300 r.p.m. The mixture is stirred for further 3 minutes at the same temperature, then allowed to stand for a while, whereby granules are deposited. The granules are collected by filtration and washed with 5,000 parts by volume of acetone, followed by drying under reduced pressure at 35° C. The procedure yields 640 parts by weight of a granular enzyme preparation.

EXAMPLE 5

500 parts by volume of an aqueous solution of 100 parts by weight of purified protease (143,000 PU/ml.) is blended with a solution of 500 parts by weight of sodium sulfate (anhydrous)) in 2,000 parts by volume of lukewarm water, and while the blend is held at 30°–40° C. with agitation at 300 r.p.m., 5,000 parts by volume of acetone is added. The mixture is stirred for further 3 minutes at the same temperature and, then, allowed to stand for a while, whereby granules are deposited. The granules are filtered by centrifuge, washed with acetone and dried under reduced pressure at 40° C. The procedure yields granules, the characteristics of which are also tabulated hereinbelow. Substantially, no reduction in enzyme units is encountered during the foregoing process.

EXAMPLE 6

50 parts by volume of an aqueous solution of 10 parts by weight of protease (58,000 PU/ml.) is blended with a solution of 57 parts by weight of sodium citrate (hydrate having 2 moles water) in 150 parts by volume of water, and the blend is added dropwise to 500 parts by volume of acetone, at 30–40° C., with stirring at 500 r.p.m. The mixture is stirred for further 3 minutes and, then, allowed to stand for a while, whereby granules are deposited. The supernatant is removed by decantation and the granules are washed with 250 parts by volume of acetone and dried under reduced pressure at 40° C. The procedure yields 61 parts by weight of granules.

TABLE 1.—RESULTS OF THE EXAMPLES

| | Sample obtained in Example— | | | | | |
|---|---|---|---|---|---|---|
| | 1 | 2 | 3 | 4 | 5 | 6 |
| Crude specific volume (ml./g.) | 3.75 | 1.9 | 2.70 | 2.2 | 3.15 | 2.50 |
| pH (0.1% solution) | 6.8 | 9.3 | 9.0 | 9.3 | 6.8 | 7.12 |
| Enzyme units (PU/mg.) | 63 | 28.8 | 51.4 | 23 | 161 | 48 |
| Yield based on enzyme units (%) | 100 | 90 | 98 | 80 | 100 | 100 |
| Grain side distribution: | | | | | | |
| 0.074–3.36, mm | 100 | 100 | 100 | 100 | 100 | 100 |
| 0.175–1.397, mm | 92 | 62 | 62 | 64 | 91 | 67 |
| Peak, mm | 0.42 | 0.81 | 1.0 | 0.81 | 0.5 | 1.0 |
| Moisture content (%) | 2.5 | 17 | 21.4 | 19 | 3.8 | 19 |

What is claimed is:

1. A method for producing a granular enzyme preparation, which comprises blending an aqueous solution containing about 3.1 to about 3.9 of enzyme and about 5 to about 50% of water soluble salt with a hydrophilic organic solvent, in a ratio of 1:about 1 to about 10 by volume, at the temperature ranging about 5° to about 40° C. with stirring, recovering the resulting granules and drying the granules.

2. A method according to claim 1, wherein the aqueous solution is one containing about 30 to about 50% of water soluble salt; the ratio of the aqueous solution:hydrphilic organic solvent being 1:about 2 to about 5.

3. A method according to claim 1, wherein the enzyme is alkali protease and the salt is sodium sulfate.

4. A method according to claim 1, wherein an aqueous solution containing alkali protease obtained by fermentation of Fusarium sp. S–19–5 (IFO 8884) and about 30 to about 50% of water soluble salt is blended with a hydrophilic organic solvent, in a ratio of 1:about 2 to about 5 by volume.

References Cited

UNITED STATES PATENTS

| 3,119,750 | 1/1964 | Faucett et al. | 195—68 |
| 3,600,319 | 8/1971 | Gedge III et al. | 252—544 X |
| 3,652,399 | 3/1972 | Isono et al. | 195—62 |
| 3,715,279 | 2/1973 | Suzuki et al. | 195—68 |

LIONEL M. SHAPIRO, Primary Examiner

U.S. Cl. X.R.

252—Dig. 12